United States Patent [19]
Robuck et al.

[11] Patent Number: 5,235,919
[45] Date of Patent: Aug. 17, 1993

[54] PICNIC TABLE AND FLYING INSECT CONTROL APPARATUS

[76] Inventors: Norman F. Robuck; Geraldine Robuck, both of 1427 NE. 64th, Altoona, Iowa 50009

[21] Appl. No.: 723,766

[22] Filed: Jul. 1, 1991

[51] Int. Cl.$^5$ ............................................. A47B 35/00
[52] U.S. Cl. ................................. 108/50; 116/22 A
[58] Field of Search .................... 108/50, 161, 90, 28; 248/231.7, 689; 211/119.1, 119.01; 116/22 A

[56] References Cited

U.S. PATENT DOCUMENTS

| | | | |
|---|---|---|---|
| 2,988,310 | 6/1961 | Wright | 108/50 X |
| 3,333,007 | 8/1967 | Locatelli | 248/231.7 |
| 3,436,882 | 4/1969 | Keefe | 116/22 A X |
| 4,074,653 | 2/1978 | Pember | 116/22 A |
| 4,573,427 | 3/1980 | Konzak | 116/22 A |
| 4,890,571 | 1/1990 | Gaskill | 116/22 A |
| 4,903,630 | 2/1990 | Rezmer | 116/22 A |

Primary Examiner—Jose V. Chen
Attorney, Agent, or Firm—Leon Gilden

[57] ABSTRACT

A picnic table mounts a plurality of support members at each end thereof extending orthogonally relative to the top surface of the table. The support members include a plurality of spaced parallel rods, with each rod including a series of equally spaced parallel and coextensive ribbons extending downwardly therefrom, wherein the ribbon flexible construction effects prevailing winds to effect a fluttering of the ribbons and thereby discourage flying insects about the table.

5 Claims, 4 Drawing Sheets

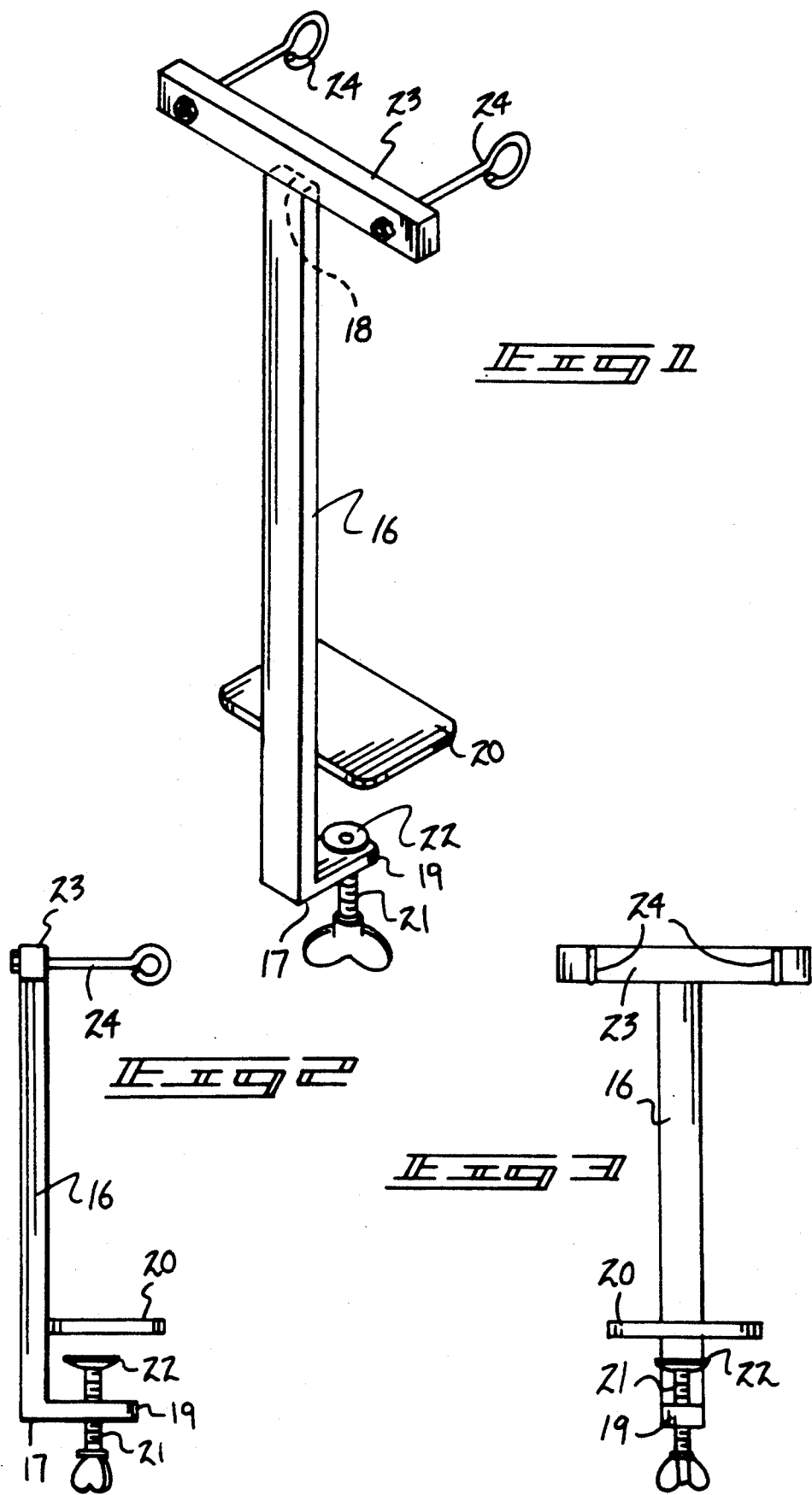

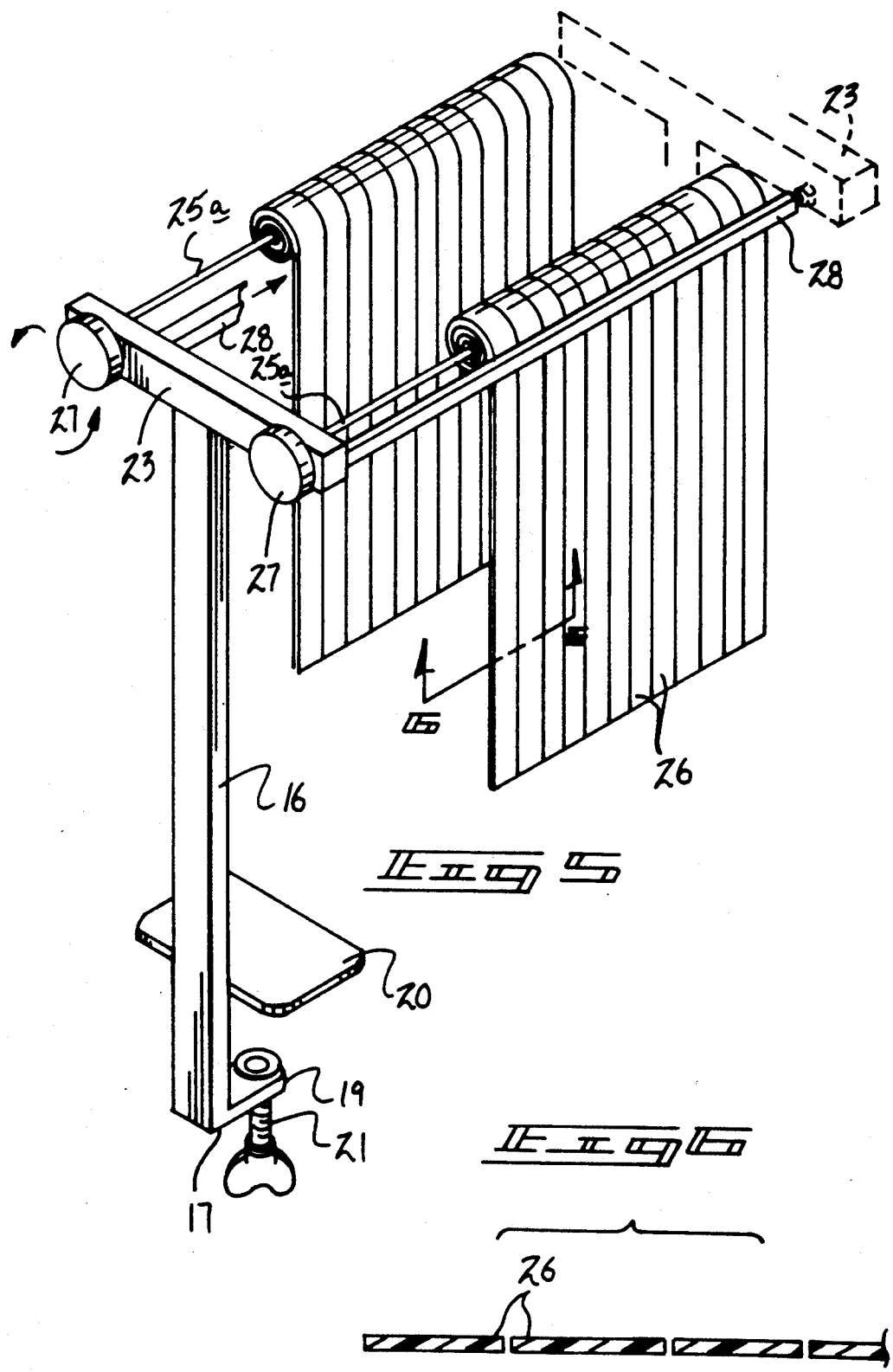

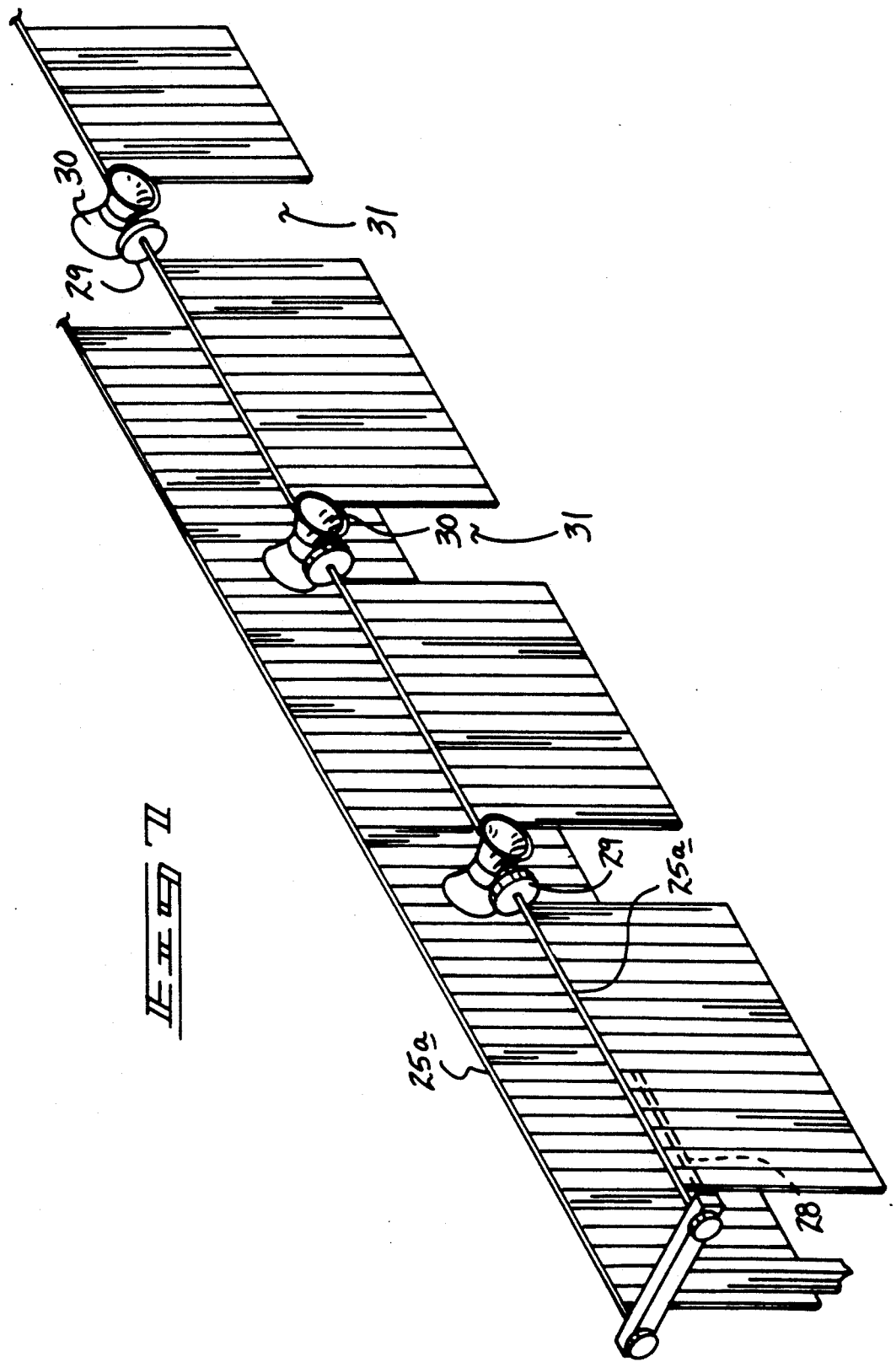

PICNIC TABLE AND FLYING INSECT CONTROL APPARATUS

BACKGROUND OF THE INVENTION

1. Field of the Invention

The field of invention relates to table apparatus, and more particularly pertains to a new and improved picnic table and flying insect control apparatus wherein the same is arranged to discourage flying insects from any predetermined area about a picnic table to permit individuals to enjoy table usage without resort to chemical pest controls.

2. Description of the Prior Art

Picnic table construction in the prior art usually for use in an outdoor environment, such as for picnics and the like, brings along attendant insects wherein prior art structure has typically resorted to chemical control of insects, whereas the instant invention attempts to overcome deficiencies of the prior art by providing insect control utilizing mechanical agitators to discourage flying insects from entering an area about the table structure of the invention. In this manner, prior art tables may be retrofitted with the mechanical agitators to effect this repulsion of insects.

Accordingly, it may be appreciated that there continues to be a need for a new and improved picnic table and flying insect control apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of table apparatus now present in the prior art, the present invention provides a picnic table and flying insect control apparatus wherein the same is arranged to effect mechanical fluttering of various ribbons to discourage flying insects from about an associated picnic table structure. As such, the general purpose of the present invention, which will be described subsequently in greater detail, is to provide a new and improved picnic table and flying insect control apparatus which has all the advantages of the prior art table apparatus and none of the disadvantages.

To attain this, the present invention provides a picnic table mounting a plurality of support members at each end thereof extending orthogonally relative to the top surface of the table. The support members include a plurality of spaced parallel rods, with each rod including a series of equally spaced parallel and coextensive ribbons extending downwardly therefrom, wherein the ribbon flexible construction effects prevailing winds to effect a fluttering of the ribbons and thereby discourage flying insects about the table.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved picnic table and flying insect control apparatus which has all the advantages of the prior art table apparatus and none of the disadvantages.

It is another object of the present invention to provide a new and improved picnic table and flying insect control apparatus which may be easily and efficiently manufactured and marketed.

It is a further object of the present invention to provide a new and improved picnic table and flying insect control apparatus which is of a durable and reliable construction.

An even further object of the present invention is to provide a new and improved picnic table and flying insect control apparatus which is susceptible of a low cost of manufacture with regard to both materials and labor, and which accordingly is then susceptible of low prices of sale to the consuming public, thereby making such picnic table and flying insect control apparatus economically available to the buying public.

Still yet another object of the present invention is to provide a new and improved picnic table and flying insect control apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a support member structure of a plurality of support members utilized by the invention.

FIG. 2 is an orthographic side view of the support member as illustrated in FIG. 1.

FIG. 3 is an orthographic frontal view, taken in elevation, of the support member, as illustrated in FIG. 1.

FIG. 5 is an isometric illustration of a modified aspect of the invention.

FIG. 6 is an orthographic view, taken along the lines 6—6 of FIG. 5 in the direction indicated by the arrows.

FIG. 7 is an isometric illustration of a further modified aspect of the invention.

DESCRIPTION OF THE PREFERRED EMBODIMENT

Figure 4:
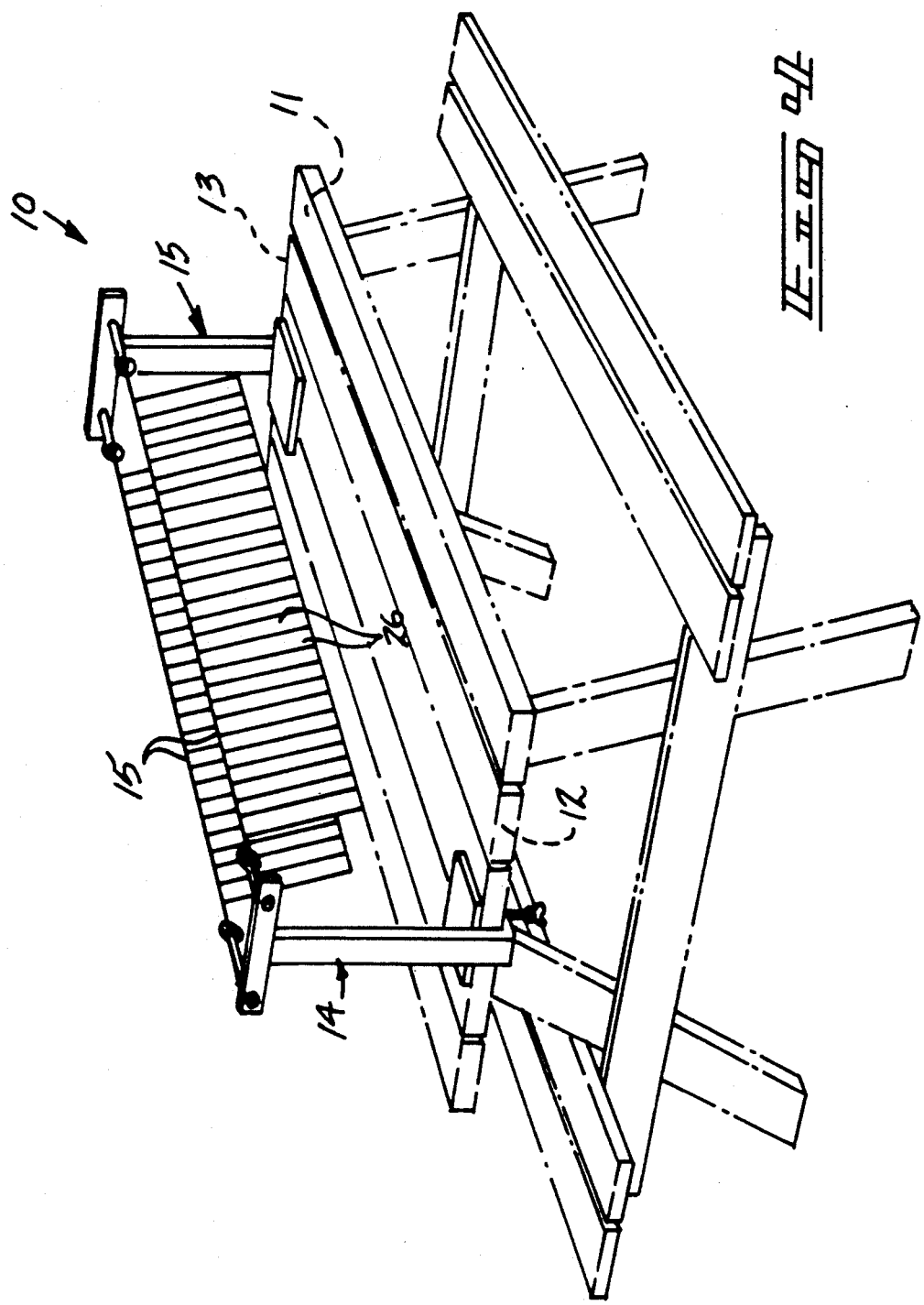
FIG. 4 is an isometric illustration of the instant invention.

With reference now to the drawings, and in particular to FIGS. 1 to 7 thereof, a new and improved picnic table and flying insect control apparatus embodying the principles and concepts of the present invention and generally designated by the reference numeral 10 will be described.

More specifically, the picnic table and flying insect control apparatus 10 essentially comprises a table plate 11 of a picnic table structure, as illustrated in FIG. 4, wherein the table plate includes a first table end 12 spaced from a second table end 13. A first support member 14 is mounted to the first table end orthogonally oriented relative to the table plate top surface, with a second support member 15 arranged parallel relative to the first support member mounted to the second table end, wherein the first and second support members are of an identical mirror image configuration mounted to the table plate 11 to respective first and second table ends 12 and 13 thereof.

Each support member 14 and 15 includes a central vertical post 16 defined by a respective lower and upper terminal end 17 and 18. The lower terminal end includes a lower clamp leg 19 orthogonally oriented relative to the post 16, with the upper terminal end 18 fixedly mounting an upper clamp leg 20 positioned above the lower clamp leg 19 in a parallel relationship. The lower and upper clamp legs 19 and 20 are arranged for mounting relative to respective bottom and top surfaces of the table plate 11. The upper clamp leg 20 is arranged for contiguous communication with the top surface of the table plate 11, with the lower clamp leg 19 including a threaded rod member 21 orthogonally directed through the lower clamp leg 19, with a clamp plate 22 mounted to an upper terminal end of the threaded rod member 21, with the clamp plate 22 arranged generally parallel to the upper clamp leg 20 to fixedly secure the table plate therebetween. A support post 23 is orthogonally oriented relative to an upper terminal end of the central vertical post 16 and further projecting laterally of each side of the central vertical post 16, wherein the lower and upper clamp legs 19 and 20 project forwardly of a forward surface of the central vertical post 16. The support post 23 of each support member includes a plurality of support loops 24. Each support loop 24 includes a flexible support 25 secured thereto, wherein opposed and confronting support loops of the first and second support members 14 and 15 mount a flexible support 25 therebetween. Each support 25 includes a plurality of flexible ribbons extending downwardly therefrom, wherein the ribbons are arranged in an adjacent extensive and parallel relationship relative to one another extending downwardly therefrom. The flexible ribbons are of a configuration and construction to flutter and be mechanically displaced during prevailing wind currents about the picnic table and table plate 11 to thereby mechanically thwart flying insects from about the table construction.

A modification of the invention includes rigid support rods 25a, as illustrated in FIGS. 5 and 7, with adjacent rigid guide rod members 28 arranged parallel to and in a spaced relationship below each adjacent support rod 25a, wherein as the ribbons 26 are in a furled configuration about the support rods 25a, which are in turn rotatably mounted in the confronting support post 23, the guide rods 28 maintain the ribbons in the furled configuration, as exemplified in FIG. 5 for example. A rotatable dial 27 is fixedly mounted to each support rod 25 to permit ease of rotation of each support rod about the ribbons 26.

The structure, as illustrated in FIG. 7, utilizes ribbon gaps 31 along at least one of the support rods 25a, with a wind whistle 30 mounted within the ribbon gaps, with the wind whistles 30 mounted in an orthogonal orientation relative to the respective rigid support rods 25a. The wind whistles permit audible indication of available wind for announcing availability of the ribbons in an agitated manner to invite individuals to sit about the table plate 11. Spacer disks 29 are provided, if desired, for abutment of the ribbons to maintain their spacings relative to the ribbon gaps 31 and the associated wind whistles 30.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A picnic table and flying insect control apparatus, comprising,
   a table plate, the table plate including a first table end and second table end, the table plate including a planar top surface spaced from a planar bottom surface, a first support member fixedly mounted to the first table end orthogonally oriented relative to the top surface, and
   a second support member fixedly mounted to the second table end orthogonally oriented relative to the top surface, and
   the first support member and second support member extending orthogonally and upwardly relative to the first table end when the first support member and second support member are in a parallel relationship relative to one another, and each respective first and second support member includes a respective first and second respective central vertical post, each vertical post arranged in a parallel relationship relative to one another, and each vertical post including a post upper terminal end and a post lower terminal end, and clamp means mounting each lower terminal end to the table plate, and each upper terminal end including a support post, and each said post arranged in a parallel relationship relative the table plate top surface, and a plurality of support rods, each support rod of said support rods orthogonally secured between opposing support posts, and said each support rod including a plurality of flexible ribbons mounted along said each support rod, and the flexible ribbons are arranged in an adjacent, coextensive relationship relative to one another.

2. An apparatus as set forth in claim 1 wherein the support rods are of a cylindrical rigid construction, and each support rod is rotatably directed through each support post, and each outer terminal end of each support rod includes a rotary dial member fixedly mounted thereto with each rotary dial member rotatably mounted relative to one said support post to permit selective rotation of each support rod and selective furling of the flexible ribbons mounted thereon.

3. An apparatus as set forth in claim 2 wherein each vertical post includes an upper clamp leg orthogonally and fixedly mounted to each vertical post adjacent each lower terminal end spaced therefrom, and each vertical post including a lower clamp leg orthogonally and fixedly mounted to the lower terminal end of each vertical post, and the upper clamp leg in contiguous communication with the table plate top surface, and a threaded rod orthogonally directed through the lower clamp leg, and a clamp plate mounted on an upper terminal end of each clamp leg in facing relationship with the clamp leg to secure the table plate therebetween.

4. An apparatus as set forth in claim 3 including a plurality of wind whistles mounted to each support rod, each wind whistle arranged for effecting an audible output during available wind directed therethrough.

5. An apparatus as set forth in claim 4 wherein each support rod includes an adjacent parallel guide rod member, each guide rod member orthogonally and fixedly mounted between opposed support posts coextensive with the support rod.

* * * * *